United States Patent [19]
Strong et al.

[11] Patent Number: 5,318,389
[45] Date of Patent: Jun. 7, 1994

[54] TOWED ARRAY HOSE TERMINATION PREPARATION TOOL APPARATUS

[75] Inventors: David N. Strong, East Haddam; Durrell B. Rader, Mystic, both of Conn.

[73] Assignee: The United States of America as represented by the Secretary of the Navy, Washington, D.C.

[21] Appl. No.: 58,019

[22] Filed: May 6, 1993

[51] Int. Cl.$^5$ ............................................. B26B 27/00
[52] U.S. Cl. .................................. 408/1 R; 30/90.1; 408/204
[58] Field of Search ............... 30/90.1, 90.4, 90.8; 81/9.4; 408/1 R, 204

[56] References Cited

U.S. PATENT DOCUMENTS 4,111,593 9/1978 Carrillo, Jr. ..................... 408/204
4,345,375 8/1982 Hayward ....................... 430/90.1

FOREIGN PATENT DOCUMENTS 2254028 9/1992 United Kingdom ............... 408/204

Primary Examiner—Steven C. Bishop
Attorney, Agent, or Firm—Michael J. McGowan; Prithvi C. Lall; Michael F. Oglo

[57] ABSTRACT

The present invention relates to a hose termination apparatus for sizing an inner diameter and an outer diameter towed-sonar-array-strength-reinforced-flexible-tubing to prepare a tubing termination end face to mate with a precision formed tubing termination piece and a method for using the apparatus. The apparatus includes a first inner diameter sizing jig and material removal tool pair comprising an inner diameter sizing jig and a first material removal tool assembly and a second outer diameter sizing jig and material removal tool pair comprising a second material removal tool assembly and a mandrel.

21 Claims, 3 Drawing Sheets

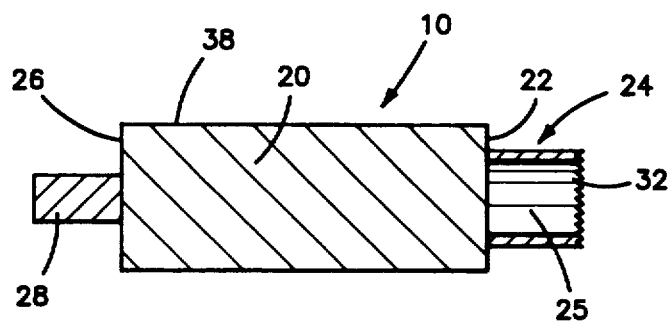
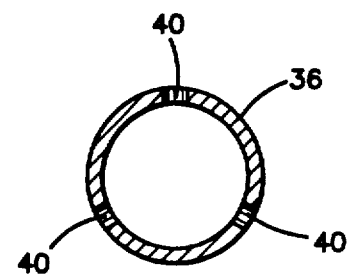
FIG-1    FIG-2
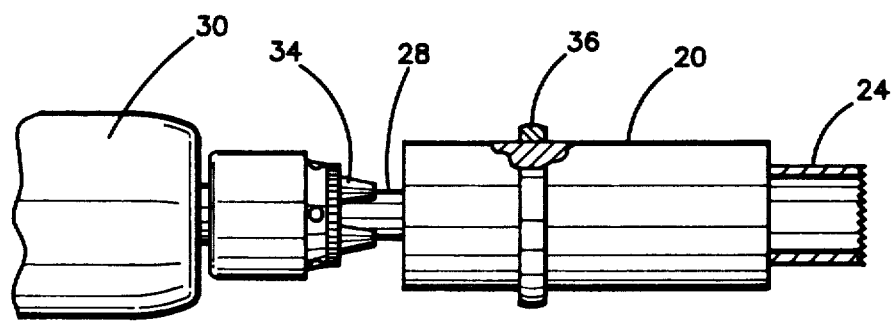
FIG-3
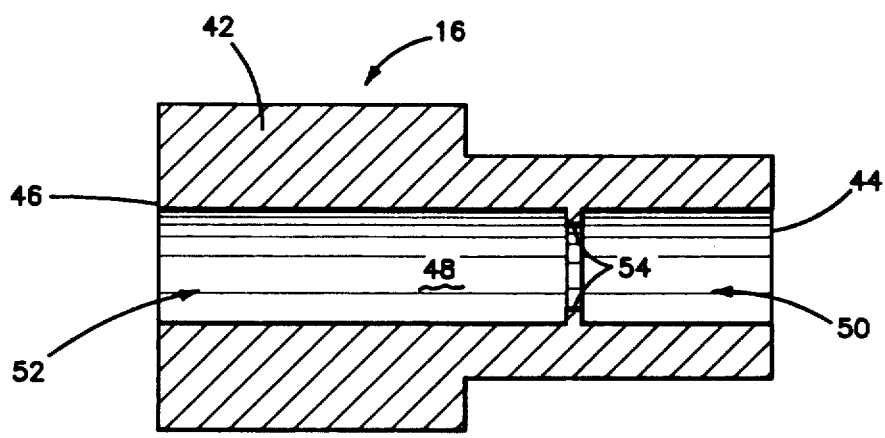
FIG-4

TOWED ARRAY HOSE TERMINATION PREPARATION TOOL APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an apparatus for preparing an end of a hose used in a towed array system to accept a mechanical termination and to a method for using the apparatus.

(2) Description of the Prior Art

A variety of devices are known in the art to ream, bevel, taper, counterbore, and scarf tubular members such as pipes. Reamers are used to remove burrs from the inside of a pipe which are created by cutting or drilling the pipe. U.S. Pat. No. 1,298,570 to Salley; U.S. Pat. No. 1,362,325 to Kemna; U.S. Pat. No. 1,414,480 to Midgley; U.S. Pat. No. 2,330,242 to Romero; and U.S. Pat. No. 4,486,129 to Vowel illustrate some of the reamers known in the prior art.

The reamer shown in the Salley patent is used to remove burrs from a metal pipe. The reamer includes a reaming tool attached to a manually operated crank. The reamer is connected to a pipe holder having thread cutting die members by a bracket having a threaded end into which the shank of the crank is inserted.

The Kemna patent illustrates a reamer comprising a cutter member mounted to a straight round shank. The cutter member has a plurality of longitudinally extending blades about its periphery. An adjustable sleeve is mounted about the cutter member to form a stop for limiting the depth to which the reamer can go.

The Midgley patent illustrates another manually operated reamer. In this device, a cutter is attached to an end of a spindle which is in turn connected to a manually actuated crank. The device further includes straps connected to a mechanism for holding the pipe in a desired position.

The Romero patent illustrates a reamer having a cutting blade placed within the frusto-pyramidical portion of a casing. The reamer is attached to the pipe to be reamed by two chuck jaws and a locking lever. The casing housing the cutting blade is mechanically joined to a second casing having a manually operated handle associated therewith. By grasping the handle, the reamer is rotated and gradually fed into the pipe.

While the aforementioned Salley, Kemna, Midgley and Romero patents are directed to devices for reaming metal pipes, the Vowel patent relates to a reamer for reaming the bell of a plastic device. The Vowel reamer includes a cylindrical housing and a reamer positioned within a chamber in the housing. The device further includes set screws for holding a pipe to be reamed in a desired position relative to the reamer.

U.S. Pat. No. 2,616,462 to Haddican; U.S. Pat. No. 3,595,107 to Dackow; U.S. Pat. No. 3,603,182 to Jackman et al.; U.S. Pat. No. 3,817,649 to Medney; U.S. Pat. No. 3,834,254 to Smestad; U.S. Pat. No. 4,691,600 to Carlson et al.; and U.S. Pat. No. 4,958,542 to Skerrett illustrate different devices for tapering or scarfing the ends of pipes. The Haddican patent, for example, illustrates a tool for tapering the ends of fiber pipes. The tool includes a longitudinal spindle, an expansible chuck assembly on the spindle adapted to be received in one end portion of the pipe and to be placed in rigid contact with the pipe, a rotary handle attached to the spindle, and a pipe end taper cutting device mounted on the rotary handle. In addition to a taper cutting blade, a pipe end cutting blade is provided to square off the end of the pipe as needed.

The Dackow patent illustrates a rotary tool for concurrently forming a circumferential taper of desired angulation on an end portion of a length of plastic pipe and facing the end extremity of the portion to be normal to the longitudinal axis of the pipe. The tool is formed by a solid cylindrical mandrel having a recess into which a power driven member can be inserted. The tool further includes a cutter blade attached to the mandrel by a cutter bar.

The Jackman et al. patent illustrates another manually operated tool for tapering a glass-fiber-reinforced pipe. The tool includes a cylinder for supporting the pipe attached to a head bar. The tool also includes a cutter blade attached to the head bar. Handles associated with the head bar are manipulated to engage the cutting blade into the pipe surface and gradually trim off the glass-fiber-reinforced plastic material on the pipe end.

The Medney patent illustrates a pipe scarfing tool having a rotatable housing in which a plurality of cutting blades are included. The cutting blades are generally radially oriented and extend longitudinally at an angle with respect to the rotational axis of the housing. A keying means such as a flat is provided at one end of the housing. The keying means is adapted to be received in the chuck of a drill.

The Smestad patent relates to a pipe tapering tool having separable parts for internal and external tapering of pipe walls. The external tapering tool includes an internal drum for insertion into the pipe and a housing to which a cutting blade is attached. The internal tapering tool has an extension member which fits into a tool receiving bore in the internal drum. A turn shaft is provided to rotate the tool.

The Carlson et al patent illustrates a pipe shaver having an elongated mandrel and a plurality of cutting tools. The mandrel is secured to a cup-shaped body having a plurality of lugs for carrying circular cutting tools. A power unit having an electric motor may be used to rotate the shaver.

The Skerrett patent illustrates a device for tapering the end of a fiberglass tube. The device includes an expandable mandrel for centering the apparatus on the pipe and a cylindrical cutting head connectable to a power unit for rotation in the mandrel while tapering the outside surface of the pipe end section. The cutting head has a segmented body with removable cutting blades set at an angle to taper the pipe end.

U.S. Pat. No. 3,992,123 to Uyetake relates to an apparatus for machining pipe ends. The apparatus includes an annular housing which is adapted to receive a pipe end. A plurality of rods are threaded radially through the housing and are adjustable inwardly for engaging the pipe so as to enable axial alignment of the housing with the pipe end. A chuck is slidably mounted within the cylindrical housing for longitudinal reciprocal movement toward and away from the pipe end. The chuck is also rotatably mounted within the housing. A large nut may be threaded on the housing for positioning and retaining the chuck at selected locations along the longitudinal axis of the housing. One or more tool bits are located at one end of the chuck for machining the end of the pipe when the chuck is rotated within the housing.

U.S. Pat. No. 2,492,783 to Chamberlain relates to rubber lined pipes and the provision of a tool for counterboring the rubber lining at the end of the pipe to receive a joint-sealing member. The cutting tool comprises a combination of cutting blades which effect simultaneously a radial helical cut and a circumferential cut, leaving a clean counterbore in the rubber lining. The cutting edges of the blades are shaped to prevent rubbing on the wall of the rubber bore and are sloped so that they slice the rubber with a dragging cut and, accordingly, do not appreciably displace the rubber during cutting. Both cutting blades are fixed in a cutter head mounted on a rotatable and reciprocable shaft. The blades are preferably set so that they both cut in the same radial plane as they rotate. The tool also includes a clamping means for attachment to an end of the pipe to be bored and a drive means for the shaft with guide means for centering the cutter head in the pipe.

The devices for shaping pipes set out in the aforementioned patents are mechanically complex. In addition, there is no one device which precisely sizes both an inner and outer diameter of a tubular workpiece such as a hose. Thus, there is a need for a device or tool which is relatively simple in nature and relatively inexpensive to manufacture that can be used to precisely size both an inner and an outer diameter of a tubular workpiece. There is also a need for a material removal tool which would not displace towed-sonar-array-strength-strand-reinforced-flexible-tubing to an extent which would cause destructive distortion of the strength strand pattern.

Accordingly, it is an object of the present invention to provide an apparatus for preparing the termination of a tubular workpiece such as a towed array hose.

It is another object of the present invention to provide an apparatus as above which allows the inner and outer diameters of the hose to be sized to close tolerances and concentricity without damaging or exposing strength members positioned within the material forming the tubular workpiece.

It is a further object of the present invention to provide an apparatus as above which is relatively inexpensive to manufacture, portable and easy to use.

It is a further object of the present invention to provide a method for preparing an end of a hose to receive a termination piece which is easy to perform.

Still other objects and advantages to the present invention will be set forth in the following description and the associated drawings in which like reference numerals depict like elements.

SUMMARY OF THE INVENTION

In accordance with the present invention, an apparatus is provided for preparing an end of a tubular workpiece, such as a hose for a towed sonar array, to accept a mechanical termination while insuring close tolerances and concentricity. The apparatus includes a first means for sizing an inner diameter of the hose forming the workpiece and a second means for sizing an outer diameter of the hose. The first sizing means comprises an inner diameter cutter assembly. In a preferred embodiment of the present invention, the inner diameter cutter assembly is formed by a first body of revolution, such as a cylindrical body, having two opposed end surfaces, integral tang means for fitting into a chuck of a power tool adjacent a first one of the opposed end surfaces, and means for cutting an interior surface of the hose attached to a second one of the opposed end surfaces. The cutter assembly also preferably includes a movable collar surrounding the outer periphery of the cylindrical body to regulate the depth of the cut made by the cutting means. The first sizing means further includes an inner diameter sizing jig which acts as a means for aligning the hose to receive the inner diameter cutter assembly. In a preferred embodiment of the present invention, the jig is formed by a second cylindrical body having a central bore into which an end of the hose is inserted and into which the cutting means of the cutter assembly is inserted.

The second means for sizing the outer diameter comprises an outer diameter cutter assembly. In a preferred embodiment, the outer diameter cutter assembly includes another body of revolution, such as a cylindrical body, having two opposed ends and a cavity portion. Integral tang means for fitting into the chuck of a power drill are positioned adjacent a first one of the two ends and a cutting tool is positioned adjacent a second one of the two ends. The second means further includes a plastic mandrel to be inserted into the tubular workpiece.

In accordance with the present invention, the method for preparing an end of a tubular workpiece such as a hose to accept a mechanical termination comprises providing an inner diameter sizing jig having a central bore with a radially extending collar located therein, inserting an end of the tubular workpiece into the bore until it abuts the collar, inserting the inner diameter cutting assembly into the jig until it engages the end of the workpiece, and rotating the inner diameter cutting assembly until it removes an amount of material sufficient to allow the end of the workpiece to accept the mechanical termination. The method further comprises removing the inner diameter cutting assembly and the tubular workpiece from the jig, inserting a mandrel into the tubular workpiece, and sizing the outer diameter of the tubular workpiece using the outer diameter cutting assembly.

Other features and details of the present invention are set out in the following description.

BRIEF DESCRIPTION OF THE DRAWINGS

FIG. 1 illustrates a cross sectional view of the inner diameter cutter assembly of the present invention;

FIG. 2 is a cross sectional view of the collar surrounding the periphery of the inner diameter cutter assembly;

FIG. 3 is a view of the inner diameter cutter assembly of the present invention in partial cross section;

FIG. 4 is a sectional view of the inner diameter sizing jig;

DETAILED DESCRIPTION

Figure 5:
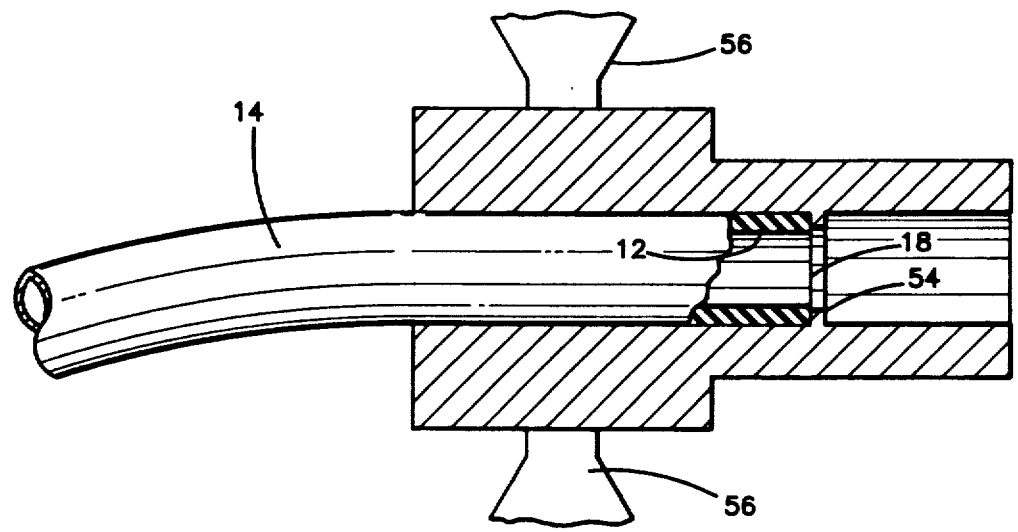
FIG. 5 is a sectional view of the inner diameter sizing jig of FIG. 4 with a hose inserted in one end.

Referring to FIGS. 1, 4 and 5, an apparatus is illustrated for sizing the inner diameter and the outer diameter of a towed-sonar-array-strength-strand-reinforced-flexible hose to prepare a termination end face of the hose to mate with a precision formed tubing termination piece. The apparatus includes first means for sizing the inner diameter of the hose and second means for sizing the outer diameter of the hose. The first means comprises an inner diameter cutter assembly 10 for removing material from an inner surface 12 of the hose 14 and an inner diameter sizing jig 16 for aligning the hose to receive the inner diameter cutter assembly 10.

As shown in FIGS. 1-3, the inner diameter cutter assembly 10 is formed by a cylindrical body of revolution 20 formed from a metallic material such as steel. The body 20 has a first end surface 22 to which a material removal tool 24 is attached and a second end surface 26 at which integral tang means 28 are provided for allowing the cutter assembly 10 to be fitted to a power drill 30.

In a preferred embodiment of the present invention, the material removal tool 24 comprises a circular ring cutting tool element 25 axially aligned with the body 20 and soldered to the first end surface 22. The circular ring cutting tool element preferably has a plurality of cutting blades 32 along an axial edge in the form of saw teeth. Preferably, the tips of the saw teeth lie in a plane which is substantially parallel to an end face 18 of the hose 14. The circular ring cutting tool element 25 in a preferred embodiment is formed from a hardened metallic strip material. The circular tool element 25 has a predetermined diameter chosen to function as a material removal tool for sizing the inner diameter of the towed-sonar-array-strength-strand-reinforced-flexible-tubing forming the hose 14.

The tang means 28 is formed integrally with the body 20 and is sized to fit within a chuck 34 of a power drill 30. In a preferred construction, the tang means 28 is also formed from an iron alloy such as steel.

The cutter assembly 10 further includes an adjustable collar 36 surrounding and slidably engaging an outer peripheral surface 38 of the body 20. The adjustable collar, as shown in FIG. 2, has a plurality of apertures 40 through which means (not shown) for securing the collar at a selected axial position such as threaded pins or screws may be inserted. The adjustable collar 36 serves as a stop means for limiting the axial penetration of the cutting tool element 25 into the end of the hose.

The inner diameter sizing jig 16 is illustrated in FIGS. 4 and 5. The jig 16 comprises means for aligning the hose 14 to receive the inner diameter cutter assembly 10. The jig 16 is preferably formed by a hollow cylindrical body 42 having a first end 44 for receiving the inner diameter cutter assembly 10, a second end 46 into which the towed-sonar-array-strength-strand-reinforced-flexible-tubing forming the hose is inserted, and a central bore 48 extending between the two ends. The bore 48 is divided into a first axially extending bore section 50 adjacent the first end 44 and a second axially extending bore section 52 adjacent the second end 46. The second bore section 52 in a preferred embodiment has an inner diameter which cooperates with the outer diameter of the hose 14 so that when the hose is impressed into the second bore section, it is rendered relatively immovable by virtue of a forced fit. The first and second bore sections 50 and 52 are separated by a fixed, radially inwardly projecting collar 54. As shown in FIG. 5, the collar 54 acts as a stop means for limiting the degree to which the hose 14 may be inserted into the bore 48. While any suitable material known in the art may be used to form the jig 16, it is preferred to form it from a metallic material such as an aluminum alloy.

As shown in FIG. 5, clamping means 56 are provided to maintain the jig 16 rigid against rotation. This in turn maintains the towed-sonar-array-strength-strand-reinforced-flexible-tubing, which is force fitted into the second bore section 52, rigid against rotation under the torquial drag imparted to the end face 18 by the material removal action of the saw-toothed edge of the material removal tool 24 when power is applied by the drill 30 to the tang means 28. The clamping means 56 may comprise any suitable clamping arrangement known in the art.

As previously discussed, the apparatus also includes second jig and material removal tool pair means for sizing the outer diameter of the hose 14 (FIG. 5) at the end face 18. This outer diameter sizing means is formed by a pair of elements which includes an outer diameter cutter assembly 58 for removing material from an outer surface of the hose 14 and a mandrel 60 formed as a cylindrical body of revolution having a single stepped diameter from a plastic material.

Figure 6:
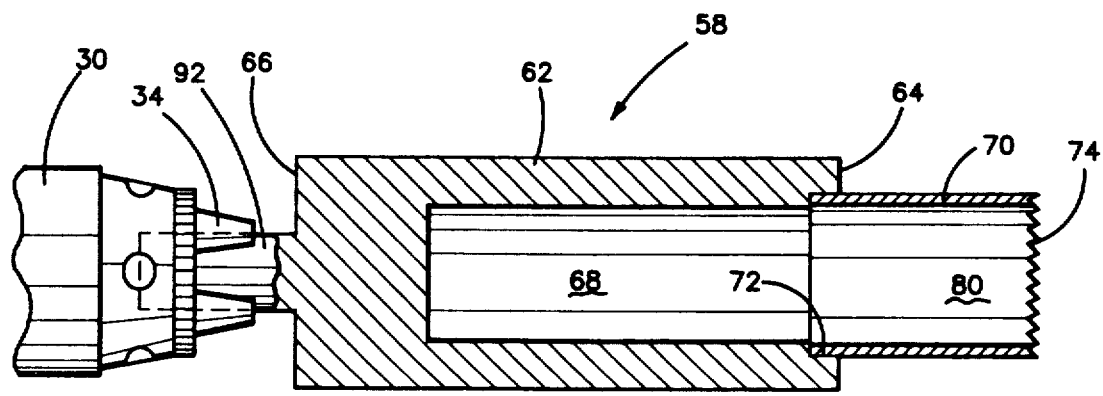
FIG. 6 is a sectional view of the outer diameter cutter assembly.

The outer diameter cutter assembly 58 is shown in FIG. 6. It comprises a body of revolution such as a cylindrical body 62 having a first material removal tool end 64 and a second handheld power drill tang end 66 with a concentric, axially extending, cylindrical cavity portion 68 formed in the first end 64. A circular ring tool element 70 is fixedly secured to the body 62, such as by soldering, and projects from the first end 64. As can be seen from FIG. 6, one end of the tool element 70 is seated within a circumferential recess 72 formed in the walls defining the cavity portion 68. Tang means 92 for fitting into a chuck 34 of a power drill 30 are integrally formed with the body 62 at the second end 66.

The tool element 70 is preferably formed from a hardened metallic strip material whose axially outer edge has a series of cutting blades formed by saw teeth 74. Preferably, the cutting blades formed by the saw teeth have tips which lie in a plane which is substantially parallel to an end plane of the hose 14 containing the opening into which the mechanical termination device is to be inserted. The tool element 70 is coaxially aligned with the body 62. The tool element 70 has a diameter which enables it to remove material from the outer surface 76 of the hose and thereby size the outer diameter of the hose.

Figure 7:
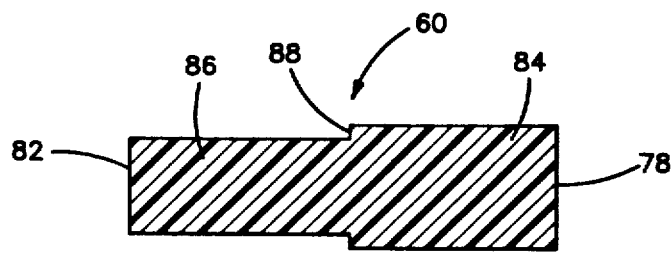
FIG. 7 is a sectional view of a mandrel which forms part of the means for sizing the outer diameter of the hose being prepared.

The mandrel 60, shown in FIG. 7, has a first end 78 for projection into the void space 80 of the tool element 70 and into the cavity portion 68 and a second end 82 for receiving the towed-sonar-array-strength-strand-reinforced-flexible-tubing in the relationship of a sheath around the mandrel. The mandrel is divided into a first axial section 84 extending from the first end 78 with the cylindrical exterior thereof adapted to slidingly engage the cylindrical wall of the cavity portion 68 and a second small diameter axial section 86 extending from the second end 82. The axial section 86 preferably has a diameter which cooperates with the finally sized inner diameter of hose adjacent the end face 18 to receive the hose in a force-fitted sheath relationship. The surface 88 formed by the point of demarcation at the step of the stepped outer diameter between the first and second axially extending sections 84 and 86 provides an annular stop surface against which the hose 14 abuts. (See FIG. 8).

Figure 8:
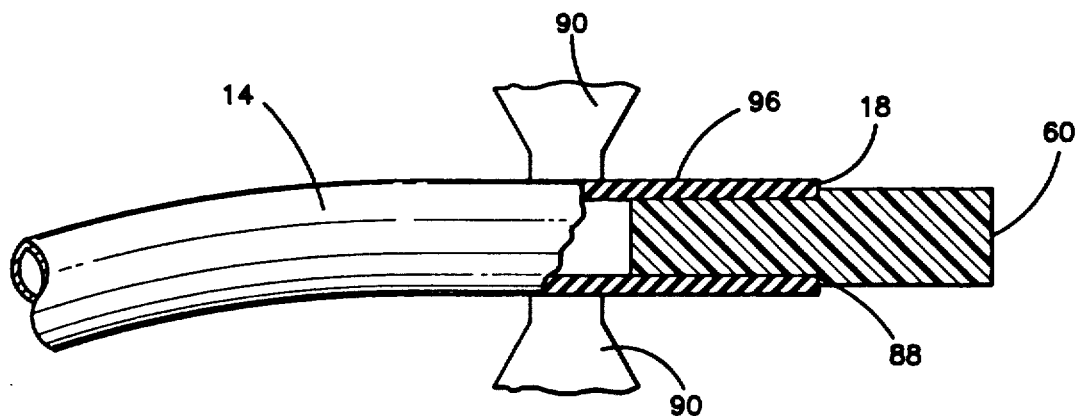
FIG. 8 is a view of the mandrel of FIG. 7 positioned within a hose with a portion of the latter being in side elevation.

As shown in FIG. 8, clamping means 90 are provided to maintain the hose 14 rigid against rotation under the torquial drag imparted to the end face 18 of the hose by the material removal action of the saw-toothed outer edge of the tool element 70 when power is applied by the drill 30 to the tang means 92 of the outer diameter cutter assembly 58. The clamping means 90 may be formed by any suitable clamping device known in the art.

As can be seen from the foregoing description, an apparatus for operation with a hand held power drill and suitable clamping devices has been provided that is effective to finally size the inner and outer diameter of a towed-sonar-array-strength-strand-reinforced-flexible-tubing with required close tolerances and concentricity and without causing a distortion of the tubing that would lead to destructive damage to the ends of the pattern of strength strands 94 in the tubing.

While the cutting tool portions of the inner diameter cutter assembly and the outer diameter cutter assembly may be specially formed for each tool, it is possible to use commercially-available, off-the-shelf round hole saw blades manufactured to cut wood or metal for the cutting portions of the tools.

The operation of the apparatus of the present invention will now be described with reference to FIGS. 1, 3, 4 and 5. The end face 18 of the hose 14 is inserted into the central bore 48 of the inner diameter sizing jig or alignment guide 16 until the hose end face abuts the collar 54. The jig 16 is then clamped by the clamping means 56 to prevent rotation of the jig and the hose 14. The tang means 28 of the inner diameter cutter assembly is then inserted into the chuck 34 of a power drill and the collar 36 is adjusted to a desired position to insure a proper depth for the cut. Thereafter, the cutting blade portion of the cutter assembly is inserted into the cutter end 44 of the jig 16 until the cutting blades contact the end face 18 of the hose. The cutting blade is then caused to be rotated by powering up the drill 30. Rotation of the drill continues until the collar 56 abuts an end 44 of the sizing jig 16 and/or an amount of hose material sufficient to accept the mechanical termination has been removed from the inner surface 12 of the hose. After the desired amount of hose material has been removed, the cutter assembly 10 and the hose 14 are removed from the jig 16.

Figure 9:
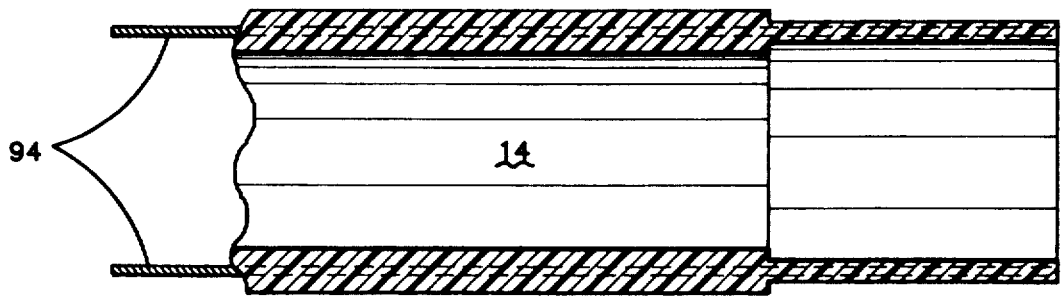
FIG. 9 illustrates a hose end that has been prepared using the apparatus of the present invention.

Referring now to FIGS. 6 and 8, the outer diameter of the hose 14 at the end face 18 is then sized by inserting the mandrel 60 into the hose and clamping the hose against rotation using the clamping device 90. The tang means 92 of the outer diameter cutter assembly 58 is then inserted into the chuck 34. The cutting portion of the assembly 58 is then positioned adjacent the hose end face 18 by inserting the first axial section 84 of the mandrel into the void space 80 of the tool element 70 and then into the cavity portion 68. The cutting portion of the assembly 58 is then caused to rotate by powering the drill 30. Again, sufficient hose wall material is removed from the exterior surface 96 of the hose to accommodate the mechanical termination. After said material has been removed, the assembly 58 is withdrawn so that the mandrel 60 can be removed from the interior of the tube 14 and the clamping means 90 are released. FIG. 9 illustrates a tube which has been processed in accordance with the method of the present invention.

By using the apparatus of the present invention, accurate, consistent, repeatable hose preparation can be provided without error or loss of hose.

It is apparent that there has been provided in accordance with this invention a towed array hose termination preparation apparatus which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. Hose termination apparatus for preparing an end of a hose to accept a mechanical termination while insuring close tolerances and concentricity, said apparatus comprising:
   first means for sizing an inner diameter of said hose;
   second means for sizing an outer diameter of said hose;
   said first means including an inner diameter cutter assembly; and
   said inner diameter cutter assembly comprising a first cylindrical body having two opposed end surfaces, integral tang means for fitting into a chuck of a power tool adjacent a first one of said opposed end surfaces, means for cutting an interior surface of said hose attached to a second one of said opposed end surfaces, and a movable collar surrounding an outer periphery of said cylindrical body to regulate the axial depth of the cut made by said cutting means.

2. The apparatus of claim 1 wherein said cutting means comprises a circular ring cutting tool element soldered to said second one of said opposed end surfaces.

3. The apparatus of claim 2 wherein said hose has an end face with which said cutting means is placed into contact and said cutting tool element has a plurality of saw teeth whose tips lie in a plane substantially parallel to said end face.

4. The apparatus of claim 2 wherein said first cylindrical body is formed from a metallic material and said tool element is formed from a hardened metallic strip material.

5. The apparatus of claim 1 wherein said first means further includes:
   an inner diameter sizing jig for aligning said hose with said inner diameter cutter assembly.

6. The apparatus of claim 5 wherein said jig comprises:
   a hollow cylindrical body having a central bore into which said end face of said hose is inserted from one end and into which said cutting means of said inner diameter cutter assembly is inserted from a second end opposed to said first end; and
   stop means within said bore for limiting the degree to which the hose may be inserted into said central bore.

7. The apparatus of claim 6 wherein said hollow cylindrical body is formed from a metallic material.

8. The apparatus of claim 6 wherein said stop means is formed by a fixed, radially inwardly projecting collar.

9. The apparatus of claim 1 wherein said second means includes:

an outer diameter cutter assembly, said outer diameter cutter assembly comprising a second cylindrical body having two ends and an axially extending cylindrical cavity portion, integral tang means for fitting into the chuck of said power drill adjacent a first one of said two ends, and cutting means adjacent a second one of said two ends.

10. The apparatus of claim 9 wherein said cavity core portion has a circumferential recess adjacent said second one of said two ends surfaces and said cutting means comprises a circular ring tool element received with said circumferential recess.

11. The apparatus of claim 10 wherein said hose has an end face containing an opening for receiving said mechanical termination and said circular ring tool element has a plurality of saw teeth whose tips lie in a plane substantially parallel to said end face.

12. The apparatus of claim 11 wherein said second cylindrical body is formed from a metallic material and said circular ring tool element is formed from a hardened metallic strip material.

13. The apparatus of claim 9 wherein said second means further includes a cylindrical mandrel sized to fit within said hose.

14. The apparatus of claim 13 further comprising:
said circular ring tool element has a void space;
said mandrel having a first axial section with a first outer diameter which allows said mandrel to enter said void space and said cavity portion; and
said mandrel having a second axial section having a second outer diameter sized to fit within said hose, said second outer diameter being smaller than said first outer diameter.

15. The apparatus of claim 13 further comprising said mandrel being formed from a plastic material.

16. A method for preparing an end of a hose to accept a mechanical termination, said method comprising the steps of:
providing an alignment guide having a bore with a stop located therein;
inserting said hose end into the bore of said alignment guide until said hose end abuts said stop;
securing said hose and said alignment guide against rotation;
inserting an inner diameter cutting assembly into said alignment guide until it engages said hose end; and
rotating said inner diameter cutting assembly until it removes an amount of hose wall material sufficient to accept said mechanical termination.

17. The method of claim 16 further comprising:
adjusting a collar around a portion of said inner diameter cutting assembly prior to said inner diameter cutting assembly inserting step to insure a proper axial depth for the cut by said cutting assembly.

18. The method of claim 16 wherein said rotating step comprises:
providing a hand held power tool;
inserting a tang portion of said inner diameter cutting assembly into a chuck associated with said hand held power tool; and
operating said power tool to cause rotation of said inner diameter cutting assembly.

19. The method of claim 16 further comprising:
removing said hose end from said alignment guide;
inserting a mandrel into an opening in said hose end;
securing said hose end; and
cutting an exterior surface of said hose end using an outer diameter cutting assembly.

20. The method of claim 19 further comprising:
inserting said outer diameter cutting assembly into the chuck of a power tool prior to said cutting step; and
said cutting step comprising rotating said outer diameter cutting assembly with said power tool.

21. An apparatus for sizing an inner diameter and an outer diameter of towed-sonar-array-strength-strand-reinforced-flexible-tubing to prepare a tubing termination end to mate with a precision formed tubing termination piece comprising:

a first inner diameter sizing jig and material removal tool pair comprising an inner diameter sizing jig and a first material removal tool assembly;
said inner diameter sizing jig of the first pair comprising a hollow cylindrical body member having a first material removal tool assembly insertion end and a second towed-sonar-array-strength-strand-reinforced-flexible-tubing insertion end and a bore extending therebetween, said bore being divided into a first axially extending bore section adjacent the first end and a second axially bore extending section adjacent the second end, said first and second bore sections being separated by a fixed, radially inwardly projecting collar, said second bore section having an inner diameter which cooperates with the outer diameter of the tubing such that when the tubing is impressed into said second bore section it is rendered relatively immovable by a forced fit;
said first material removal tool assembly of the first pair comprising a first cylindrical body of revolution member having a first material removal tool end surface and a second tang means end surface, a first circular ring tool element fixedly projecting from the first end, said first circular ring tool element being formed of hardened metallic strip material whose axially outer edge forms saw teeth and being coaxially aligned with the first body of revolution member, said first circular ring tool element having a predetermined diameter chosen to function as a material removal tool to size the inner diameter of said towed-sonar-array-strength-strand-reinforced-flexible-tubing, and an adjustable collar slidably engaging an outer peripheral surface of said first cylindrical body of revolution member, said adjustable collar being secured at a selected axial position along said outer peripheral surface to provide a stop which engages the second end of said hollow cylindrical body when the saw-toothed outer edge of the first circular ring tool element has penetrated into the end face of the tubing to a desired axial depth;
clamping means for maintaining said hollow cylindrical member rigid against rotation, which in turn maintains the towed-sonar-array-stray-reinforced-flexible-tubing which is force fitted into the second bore section of the hollow cylindrical member rigid against rotation under the torquial drag imparted to the end face of the tubing by the material removal action of the saw-toothed edge of the first circular ring tool element ring when hand drill power is applied to second tang end of said first body of revolution member;

a second outer diameter sizing jig and material removal tool pair comprising a mandrel and a second material removal tool assembly;

said second material removal tool assembly comprising a second body of revolution member having a first material removal tool end and a second hand-held power drill tang end with a concentric, axially extending cylindrical cavity formed in its first end, and a second circular ring tool element affixedly projecting from its first end, which second circular ring tool element is formed of a hardened metallic strip material whose axially outer edge forms sawteeth and is coaxially aligned with the second body of revolution member, said second circular ring tool element having a diameter which enables said second circular ring toolelement function as a material removal tool to size the outer diameter of said towed-sonar-array-strength-strand-reinforced-flexible-tubing;

said mandrel having a first end for projection into a void space at the center of said second circular ring tool element and into the cylindrical cavity of the second body of revolution and a second end for receiving said towed-sonar-array-strength-reinforced-flexible-tubing in the relationship of a sheath round the mandrel, the mandrel being divided into a first axial section extending from its first end with the cylindrical exterior thereof adapted to slidingly engage the cylindrical wall of the cavity and a second small diameter axial section extending from its second end whose diameter is chosen to cooperate with a finally sized inner diameter at the end face of the tubing following material removal action of the first inner diameter jig and material removal tool pair to receive the tubing in a force-fitted sheath relationship, said mandrel further having a point of demarcation between said first and second axially extending sections which acts as an annular stop surface against which the tubing abuts; and another clamping means cooperative with said towed-sonar-array-strength-reinforced-flexible-tubing and the mandrel when the tubing is impressed about the second axially extending section of the mandrel in a force-fitted sheath relationship thereabout, to maintain the tubing rigid against rotation under the torquial drag imparted to the end face of the tubing by the material removal action of the saw-toothed outer edge of the second circular ring tool element when hand drill power is applied to the second tang end of said second body of revolution member;

whereby said apparatus operates with a hand held power drill and said clamping means to finally size the inner diameter and outer diameter of said towed-array-strength-strand-reinforced-flexible-tubing with required close tolerances of concentricity, and without causing a distortion of the tubing that would lead to destructive damage to ends of a pattern of strength strands within the tubing.

* * * * *